United States Patent
Chaudhary et al.

(10) Patent No.: US 8,658,077 B2
(45) Date of Patent: Feb. 25, 2014

(54) METHOD OF CROSSLINKING CARBOXYL-CONTAINING POLYMERS USING OLIGOAMINES

(75) Inventors: Bharat I. Chaudhary, Princeton, NJ (US); Eric P. Wasserman, Hopewell, NJ (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/059,465

(22) PCT Filed: Aug. 5, 2009

(86) PCT No.: PCT/US2009/052777
§ 371 (c)(1),
(2), (4) Date: Feb. 17, 2011

(87) PCT Pub. No.: WO2010/025013
PCT Pub. Date: Mar. 4, 2010

(65) Prior Publication Data
US 2011/0152467 A1    Jun. 23, 2011

Related U.S. Application Data

(60) Provisional application No. 61/091,594, filed on Aug. 25, 2008.

(51) Int. Cl.
*H01B 3/44* (2006.01)
*C08F 8/32* (2006.01)
*C08J 3/24* (2006.01)

(52) U.S. Cl.
USPC ............... 264/477; 264/211.24; 525/329.5; 525/329.9; 525/330.5; 525/381; 525/382; 174/110 SR

(58) Field of Classification Search
USPC ............. 525/329.5, 329.9, 381, 382, 330.5; 264/477, 211.24
See application file for complete search history.

(56) References Cited

U.S. PATENT DOCUMENTS

| | | | |
|---|---|---|---|
| 2,772,251 A | 11/1956 | Hansen et al. | |
| 2,931,742 A | 4/1960 | Hicks | |
| 2,981,721 A | 4/1961 | Brown | |
| 3,236,917 A | 2/1966 | Natta et al. | |
| 3,266,971 A | 8/1966 | Miller | |
| 3,328,367 A | 6/1967 | Rees | |
| 3,404,134 A * | 10/1968 | Rees | 525/362 |
| 4,132,857 A * | 1/1979 | Scarola et al. | 174/107 |
| 4,445,688 A * | 5/1984 | Frillici et al. | 473/123 |
| 4,543,376 A | 9/1985 | Loch et al. | |
| 4,657,781 A | 4/1987 | Nicco et al. | |
| 4,839,422 A | 6/1989 | McElrath et al. | |
| 4,906,703 A * | 3/1990 | Bolton et al. | 525/329.9 |
| 5,010,119 A * | 4/1991 | McElrath et al. | 523/205 |
| 5,037,700 A | 8/1991 | Davis | |
| 5,194,509 A | 3/1993 | Hasenbein et al. | |
| 5,272,236 A | 12/1993 | Lai et al. | |
| 5,278,272 A | 1/1994 | Lai et al. | |
| 5,705,602 A | 1/1998 | Kawashima et al. | |
| 5,986,028 A | 11/1999 | Lai et al. | |
| 6,051,060 A * | 4/2000 | Mizobuchi | 106/499 |
| 6,114,464 A | 9/2000 | Reck et al. | |
| 6,207,762 B1 | 3/2001 | Kobayashi et al. | |
| 7,230,049 B2 | 6/2007 | Weerawarna | |
| 7,355,089 B2 | 4/2008 | Chang et al. | |
| 2003/0035944 A1* | 2/2003 | Blackwell | 428/328 |

FOREIGN PATENT DOCUMENTS

| | | |
|---|---|---|
| EP | 604 024 A2 * | 6/1994 |
| EP | 0604024 | 6/1994 |

OTHER PUBLICATIONS

Triethylenetetramine, Dow Product Information, Oct. 2001.*

* cited by examiner

*Primary Examiner* — Roberto Rabago
(74) *Attorney, Agent, or Firm* — Whyte Hirschboeck Dudek S.C.

(57) ABSTRACT

Oligoamines, such as a compound of the formula $H_2N(CH_2CH_2NH)_nH$ in which n is an integer of 2-10, crosslink polymers containing carboxyl functionality unexpectedly faster than conventional diamines such as 1,6-diaminohexane. The combination of an ethylene-acrylic acid copolymer with an oligoamine of this type is useful for, among other things, the production of crosslinked wire and cable insulation.

18 Claims, No Drawings

METHOD OF CROSSLINKING CARBOXYL-CONTAINING POLYMERS USING OLIGOAMINES

CROSS-REFERENCE TO RELATED APPLICATIONS

The present application claims priority to U.S. patent application Ser. No. 61/091,594 filed on Aug. 25, 2008, the entire content of which is incorporated by reference herein.

FIELD OF THE INVENTION

This invention relates to thermoplastic polymers. In one aspect, the invention relates to a method of crosslinking thermoplastic polymers while in another aspect, the invention relates to the crosslinking of olefin copolymers containing carboxyl functionality. In still another aspect, the invention relates such crosslinking using an oligoamine.

BACKGROUND OF THE INVENTION

Wire and cable insulating compounds are typically crosslinked by peroxide (free-radical) or silane (moisture) crosslinking, and both methods have disadvantages. Peroxides leave small molecule daughter products which can cause odor. The decomposition reaction which initiates crosslinking is difficult to control, and costly materials are added to make sure the articles do not crosslink prematurely. Moisture-crosslinking is a very time-consuming process, and generally liberates methyl or ethyl alcohol.

The crosslinking of polymers bearing carboxyl functionality, e.g., cyclic anhydride or carboxylic acid side groups off the backbone, with diamines is known. However, the rate of reaction for standard diamines such as 1,6-diaminohexane with these resins is generally too slow to be of practical use. Amine compounds with more rapid rates of reaction with anhydrides and carboxylic acids would enable articles to be formed and crosslinked with commercial speed and efficiency.

SUMMARY OF THE INVENTION

According to this invention and under comparable, standard crosslinking conditions, the use of one or more oligoamines as a crosslinker unexpectedly leads to substantially faster thermo-gelation or crosslinking of carboxyl-containing polymers than does the use of standard diamines, e.g., 1,6-diaminohexane. The combination of an ethylene-acrylic acid copolymer with one or more of oligoamines is most useful for the production of crosslinked wire and cable insulation in which the mixture is co-extruded onto cable along with optional jacketing and semiconductor insulation layers and then thermally cured in a continuous fashion.

In one embodiment of the present invention, a polymer containing pendant carboxyl groups is crosslinked in an essentially water-free, peroxide-free process comprising contacting the polymer under crosslinking conditions with at least one oligoamine selected from the group consisting of N,N'-bis(2-aminoethyl)piperazine (DAEP), N[(2-aminoethyl)2-aminoethyl]piperazine (PEEDA), tris-(2-aminoethyl) amine (TAEA) and a compound of formula I:

$$H_2N(CH_2CH_2NH)_nH \quad (I)$$

in which n is an integer of 2-10. In one embodiment, the compound of formula I is N,N'-bis(2-aminoethyl)-1,2-ethanediamine (L-TETA). In one embodiment, the oligoamine is at least one of triethylenetetramine and diethylenetriamine. In one embodiment, the oligoamine is a mixture comprising L-TETA, DAEP, PEEDA and TAEA.

The polymer typically comprises between 80 and 98 percent by weight of units derived from an olefin, preferably units derived from at least one of ethylene and propylene. In one embodiment the polymer comprises between 2 and 20 percent by weight of units derived from (meth)acrylic acid. The rate of crosslinking at elevated temperatures is very good, and neither the crosslinker nor the base resin requires pre-activation.

DETAILED DESCRIPTION OF THE PREFERRED EMBODIMENT

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, melt index or temperature, is from 100 to 500, it is intended that all individual values, such as 100, 101, 102, etc., and sub ranges, such as 100 to 144, 155 to 170, 197 to 200, etc., are expressly enumerated. For ranges containing values that are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, density, melt index, thermoplastic polymer and/or catalyst content of the reaction mixtures and products, the (meth)acrylic acid content of the thermoplastic polymer, and various process parameters.

The term "comprising" and its derivatives are not intended to exclude the presence of any additional component, step or procedure, whether or not the same is specifically disclosed. In order to avoid any doubt, all compositions claimed through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

As used with respect to a chemical compound, unless specifically indicated otherwise, the singular includes all isomeric forms and vice versa (for example, "hexane", includes all isomers of hexane individually or collectively). The terms "compound" and "complex" are used interchangeably to refer to organic-, inorganic- and organometal compounds. The term, "atom" refers to the smallest constituent of an element regardless of ionic state, that is, whether or not the same bears a charge or partial charge or is bonded to another atom. The term "amorphous" refers to a polymer lacking a crystalline melting point as determined by differential scanning calorimetry (DSC) or equivalent technique.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Reaction mixture", "reaction mass" and like terms means the combination of materials necessary or ancillary to a reaction, typically under reactive conditions. Over the course of a reaction, a reaction mixture converts into a product mixture. Depending upon the moment in time in which the reaction mixture is characterized and other factors such as whether the process is batch or continuous, the physical state of the starting and product materials, etc., it will or can contain the reactants, catalyst, solvent, processing aids, products, byproducts, impurities and the like.

"Product mixture" and like terms means the combination of materials resulting from subjecting a reaction mixture to reaction conditions. A product mixture will always contain some product and/or byproduct and depending upon a multiplicity of factors (e.g., batch versus continuous, physical state of the starting materials, etc.), it may or may not contain unreacted starting materials, catalyst, solvent, processing aids, impurities, and the like.

"Reaction conditions" and like terms generally refer to temperature, pressure, reactant concentrations, catalyst concentration, cocatalyst concentration, mixing or shear and the like that transform a reaction mixture into a product mixture. Reaction conditions influence not only the rate of reaction and conversion and selectivity starting reagents into reaction products, but often also influence the properties of the reaction products.

"Polymer" means a polymeric compound prepared by polymerizing monomers, whether of the same or a different type. The generic term polymer thus embraces the term homopolymer, usually employed to refer to polymers prepared from only one type of monomer, and the term interpolymer as defined below. It also embraces all forms of interpolymers, e.g., random, block, etc. The terms "ethylene/α-olefin polymer", "propylene/α-olefin polymer" and "silane copolymer" are indicative of interpolymers as described below.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Carboxyl", "carboxyl group", "carboxyl functionality" and like terms mean a radical or group of —COOH and includes its various derivatives such as esters, anhydrides and cyclic anhydrides, etc.

"Meth(acrylic) acid" and like terms means acrylic acid and/or methacrylic acid.

"Catalytic amount" and like terms means an amount of catalyst sufficient to promote the rate of reaction between two or more reactants by a discernable degree. In the context of this invention, a catalytic amount is the amount of catalyst necessary to promote the rate of reaction between the polymer bearing cyclic anhydride or carboxylic acid groups and the oligoamine.

"Crosslinking amount" and like terms means an amount of crosslinking agent or radiation or moisture or any other crosslinking compound or energy sufficient to impart at least a detectable (by any recognized method, e.g., xylene extractables, etc.) amount of crosslinking in the composition or blend under crosslinking conditions.

"Water-free" and like terms mean that the reaction mixture is essentially free of water other than that which may be present as an impurity or produced as a result of the process.

"Peroxide-free" and like terms mean that the reaction mixture is essentially free of peroxide other than that which may be present as an impurity or produced as a result of the process.

Thermoplastic Polymer

Thermoplastic polymers are characterized by their ability to melt to a liquid when heated and freeze to a brittle, glassy state when sufficiently cooled. Many thermoplastic polymers are of a high-molecular-weight and comprise chains associate through weak Van der Waals forces (e.g., polyethylene); and/or exhibit strong dipole-dipole interactions and hydrogen bonding (e.g., nylon), and/or even exhibit stacking of aromatic rings (e.g., polystyrene). Thermoplastic polymers differ from thermoset polymers (e.g., vulcanized rubber) as they can, unlike thermoset polymers, be re-melted and re-molded. Many thermoplastic materials are addition polymers; e.g., vinyl chain-growth polymers such as polyethylene and polypropylene. Representative thermoplastic polymers include, but are not limited to, polyesters, polycarbonates, polyurethanes, polyamides, polyvinylchloride and polyolefins.

The thermoplastic polymers useful in the practice of this invention fall into one of two categories: (i) thermoplastic polymers that are grafted with carboxyl functionality, and (ii) thermoplastic polymers that are interpolymers of an olefin and an unsaturated organic compound containing at least one site of ethylenic unsaturation (e.g. at least one double bond), and at least one carbonyl group (—C=O).

Regarding the first category, any thermoplastic polymer that can be functionalized with cyclic anhydride or carboxylic acid groups can be used in the practice of this invention. One particularly preferred class of thermoplastic polymers in this category is the polyolefins. These thermoplastic polymers include both polyolefin homopolymers and interpolymers. Examples of polyolefin homopolymers are the homopolymers of ethylene and propylene. Examples of the polyolefin interpolymers are the ethylene/α-olefin interpolymers and the propylene/α-olefin interpolymers. The α-olefin is preferably a $C_{3-20}$ linear, branched or cyclic α-olefin (for the propylene and high olefin/α-olefin interpolymers, ethylene is considered an α-olefin). Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, are α-olefins and can be used in place of some or all of the α-olefins described above. Similarly, styrene and its related olefins (for example, α-methylstyrene, etc.) are α-olefins for purposes of this invention. Illustrative polyolefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. The copolymers can be random or blocky.

More specific examples of olefinic interpolymers useful in this invention include very low density polyethylene (VLDPE) (e.g., FLEXOMER® ethylene/1-hexene polyethylene made by The Dow Chemical Company), homogeneously branched, linear ethylene/α-olefin copolymers (e.g. TAFMER® by Mitsui Petrochemicals Company Limited and EXACT® by Exxon Chemical Company), homogeneously branched, substantially linear ethylene/α-olefin polymers (e.g., AFFINITY® and ENGAGE® polyethylene available from The Dow Chemical Company), and olefin block copolymers such as those described in U.S. Pat. No. 7,355,089 (e.g., INFUSE® available from The Dow Chemical Company). The more preferred polyolefin copolymers are the homogeneously branched linear and substantially linear ethylene copolymers. The substantially linear ethylene copolymers are especially preferred, and are more fully described in U.S. Pat. Nos. 5,272,236, 5,278,272 and 5,986,028.

The polyolefin copolymers of this category of thermoplastic polymers also include propylene, butene and other alkene-based copolymers, e.g., copolymers comprising a majority of units derived from propylene and a minority of units derived from another α-olefin (including ethylene). Exemplary propylene polymers useful in the practice of this invention include the VERSIFY® polymers available from The Dow Chemical Company, and the VISTAMAXX® polymers available from ExxonMobil Chemical Company.

Blends of any of the above olefinic interpolymers can also be used in this invention, and the polyolefin copolymers can be blended or diluted with one or more other polymers to the extent that, in a preferred mode, the polyolefin copolymers of this invention constitute at least about 50, preferably at least about 75 and more preferably at least about 80, weight percent of the thermoplastic polymer component of the blend.

The polyolefins, particularly the ethylene polymers, useful in the practice of this invention typically have, prior to grafting, a density of less than 0.965, preferably less than 0.93, grams per cubic centimeter (g/cm³). The ethylene copolymers typically have a density greater than 0.85, preferably greater than 0.86, g/cm³. Density is measured by the procedure of ASTM D-792. Generally, the greater the α-olefin content of the interpolymer, the lower the density and the more amorphous the interpolymer. Low density polyolefin copolymers are generally characterized as semi-crystalline, flexible and having good optical properties, e.g., high transmission of visible and UV-light and low haze.

The ethylene polymers useful in the practice of this invention typically have, prior to grafting, a melt index greater than 0.10 and preferably greater than 1 gram per 10 minutes (g/10 min). The ethylene polymers typically have a melt index of less than 500 and preferably of less than 100, g/10 min. Melt index is measured by the procedure of ASTM D-1238 (190° C./2.16 kg).

Any unsaturated organic compound containing at least one carboxyl group (—C(O)O—) and at least one site of ethylenic unsaturation (e.g. at least one double bond) that can graft to an olefinic polymer, e.g., and ethylene or propylene homo- or copolymer, under grafting conditions can be used to introduce anhydride or acid functionality into the olefinic polymer. Representative unsaturated organic compounds that contain at least one carbonyl group are the ethylenically unsaturated carboxylic acids, anhydrides, esters and their salts, both metallic and nonmetallic. Preferably, the unsaturated organic compound contains ethylenic unsaturation conjugated with the carbonyl group. Representative compounds include maleic, fumaric, acrylic, methacrylic, itaconic, crotonic, α-methyl crotonic, cinnamic, and the like, acids and their anhydrides, ester and salt derivatives, if any. Maleic anhydride is the preferred unsaturated organic compound containing at least one site of ethylenic unsaturation and at least one carbonyl group.

The grafted olefinic polymer comprises at least 0.01, preferably at least about 0.1 and more preferably at least about 0.5, weight percent (wt %) of units derived from the unsaturated organic compound based on the combined weight of the polymer and the units derived from the unsaturated organic compound. The maximum amount of units derived from the unsaturated organic compound contained in the olefinic polymer can vary to convenience, but typically it does not exceed about 10, preferably it does not exceed about 5 and more preferably it does not exceed about 2, wt % again based on the combined weight of the polymer and the units derived from the unsaturated organic compound. The unsaturated organic compound can be grafted to the base polymer by any known technique, such as those taught in U.S. Pat. Nos. 3,236,917 and 5,194,509. For example, in the '917 patent the base polymer is introduced into a two-roll mixer and mixed at a temperature of 60° C. The unsaturated organic compound is then added along with a free radical initiator, such as, for example, benzoyl peroxide, and the components are mixed at 30° C. until the grafting is completed. In the '509 patent, the procedure is similar except that the reaction temperature is higher, e.g. 210 to 300° C., and a free radical initiator is not used.

An alternative and preferred method of grafting is taught in U.S. Pat. No. 4,950,541 by using a twin-screw devolatilizing extruder as the mixing apparatus. The base polymer and unsaturated organic compound are mixed and reacted within the extruder at temperatures at which the reactants are molten and in the presence of a free radical initiator. Preferably, the unsaturated organic compound is injected into a zone maintained under pressure within the extruder.

Regarding the second category of thermoplastic polymers useful in the practice of this invention, these are polymers in which the anhydride and/or acid functionality is incorporated directly into the polymer chain such as, for example, interpolymers of ethylene and an unsaturated organic compound, e.g., an unsaturated ester or acid. These polyolefins are well known in the art, and they can be prepared by conventional high-pressure techniques. The unsaturated esters can be alkyl acrylates, alkyl methacrylates, or vinyl carboxylates. The alkyl groups can have 1 to 8 carbon atoms and preferably have 1 to 4 carbon atoms.

Representative of this second category of thermoplastic polymers (which include copolymers and higher order polymers) are the ethylene/α,β-unsaturated carbonyl copolymers of ethylene and acrylic acid or methacrylic acid (EAA or EMAA) and their ionomers (e.g. their metal salts), ethylene and vinyl acetate (EVA) and its derivative ethylene vinyl alcohol (EVOH), ethylene and carbon monoxide (ECO), ethylene/propylene and carbon monoxide (EPCO), ethylene/carbon monoxide/acrylic acid terpolymer (ECOAA), and the like. With respect to ECO and EPCO polymers, the classes of materials described in U.S. Pat. No. 4,916,208 are illustrative of the classes of these polymers that can be used in the practice of this invention. Such polymers can be linear alternating copolymers or random copolymers.

With respect to EAA and EMAA (and their derivatives), these materials are usually produced by the free radical copolymerization of ethylene with acrylic acid or methacrylic acid. The resulting interpolymers have carboxylic acid groups along the backbone and/or side chains of the interpolymers which, in the case of their ionomers, can be subsequently neutralized or partially neutralized with a base. Preferably these interpolymers contain between 2 and 20, more preferably between 5 and 15 and even more preferably between 8 and 12, percent by weight of acrylic acid or methacrylic acid monomer units in the polymer chain. The melt index of these interpolymers is in the range of 0.5 to 1500, preferably in the range of 5 to 300 g/10 min, as determined by ASTM D-1238 Procedure A, Conditions E and N, at a temperature of 190° C.

More specific examples of the olefinic interpolymers of this second category of thermoplastic polymers include PRIMACOR® ethylene acrylic acid copolymers available from The Dow Chemical Company, ESCORENE™ ethylene vinyl acetate copolymers by ExxonMobil Chemical, and ELVAX® ethylene vinyl acetate copolymer available from DuPont. PRIMACOR® ethylene acrylic acid copolymer is a preferred thermoplastic polymer.

Oligoamines

The oligoamine (i.e., crosslinking agent) used in the practice of this invention is at least one of DAEP, (PEEDA), (TAEA) and a compound of formula I:

$$H_2N(CH_2CH_2NH)_nH \quad (I)$$

in which n is an integer of 2-10. of the formula. These oligoamines include at least one, preferably at least two, primary amino groups ($NH_2$). In one embodiment, the oligoamine is a polyamine (i.e., an amine that includes three or more amino groups) having at least two primary amino groups. To effect ionic crosslink formation, the oligoamine includes at least one primary amino group or reactive secondary amino group for amide bond formation and a secondary, tertiary, or quaternary amino group for ionic association with the anhydride or acid functionality of the polymer. Representative oligoamines include diethylenetriamine, triethylenetetramine, and tetraethylenepentamine. These oligoamines are further described in U.S. Pat. No. 7,230,049.

One particularly preferred oligoamine is triethylenetetramine as available from The Dow Chemical Company. This triethylenetetramine is a mixture comprising L-TETA, DAEP, PEEDA and TAEA characterized by, among others, such typical properties as a nitrogen content of 37 wt %, an amine value of 1443 (mg KOH/g), a pH of 11.5 (1 wt % solution), a boiling point of 277° C. (at 760 mm Hg), a freezing point of −35° C., a density of 0.978 g/ml at 20° C. and a viscosity of 26 cp at 20° C.

Process

While the equipment used to crosslink the carboxyl-functionalized polymer with the oligoamine is not critical to the invention, typically this reaction is conducted in a mixing device that can impart shear to the reaction mixture. Examples of compounding equipment are internal batch mixers, such as a Banbury™ or Bolling™ internal mixer. Alternatively, continuous single, or twin screw, mixers can be used, such as Farrel™ continuous mixer, a Werner and Pfleiderer™ twin screw mixer, or a Buss™ kneading continuous extruder. The type of mixer utilized, and the operating conditions of the mixer, will affect properties of the composition such as viscosity, volume resistivity and extruded surface smoothness.

Polymer, typically already containing carboxyl-functionality, is typically fed to an extruder followed by the oligoamine. The reaction mixture is subjected to crosslinking conditions including a temperature between the melting point of the thermoplastic polymer and 200° C. (for polyolefins), the exact temperature dependent upon a number of different variables not the least of which is whether the crosslinking is to occur during mixing, processing or post-processing. The pressure can range from sub-atmospheric to super-atmospheric. In a reaction extruder, the pressure can approach or exceed 10,000 psi (70 megaPascal, mPa) while in an open batch mixer, the pressure is typically ambient (0.1 mPa).

If grafting of carboxyl-functionality to the thermoplastic polymer is conducted in the same operation as the crosslinking, then this can be conducted by one of two methods. One method is to use a long extruder that is equipped with a grafting zone followed by a crosslinking zone. Alternatively, the grafting and crosslinking reactions may occur more or less simultaneously. Nevertheless, the preferred mode from the standpoint of technical control over the chemistry is to start with a thermoplastic polymer that is already functionalized with a carboxyl group, such as PRIMACOR® ethylene acrylic acid copolymer.

The amount of oligoamine in the reaction mixture is such that the molar ratio of amino groups to carboxyl groups is between 1:1000 and 2:1, preferably between 1:200 and 1:2. For a relatively high molecular weight polymer comprising a relatively large amount of acid functionality, e.g., an ethylene/acrylic acid copolymer containing about 50 wt % units derived from acrylic acid, only a relatively small amount of oligoamine is required for crosslinking. For a relatively low molecular weight polymer containing a relatively small amount of acid functionality, e.g., an ethylene/acrylic acid copolymer containing about 1 wt % units derived from acrylic acid, a relatively large amount of oligoamine is required for crosslinking.

The reactive blends and copolymers of this invention may contain additional additives including but not limited to antioxidants, curing agents, cross linking co-agents, boosters and retardants, processing aids, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, and metal deactivators. Additives can be used in amounts ranging from less than 0.01 to more than 10 wt % based on the weight of the composition, i.e., the crosslinked polymer.

Examples of antioxidants are as follows, but are not limited to: hindered phenols such as tetrakis[methylene(3,5-di-tert-butyl-4-hydroxyhydro-cinnamate)]methane; bis[(beta-(3,5-ditert-butyl-4-hydroxybenzyl)-methylcarboxyethyl)]sulphide, 4,4'-thiobis(2-methyl-6-tert-butylphenol), 4,4'-thiobis (2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-demthylbenzyl)diphenylamine, diphenyl-p-phenylenediamine, mixed di-aryl-p-phenylenediamines, and other hindered amine antidegradants or stabilizers. Antioxidants can be used in amounts of 0.1 to 5 wt % based on the weight of the composition.

Examples of processing aids include but are not limited to metal salts of carboxylic acids such as zinc stearate or calcium stearate; fatty acids such as stearic acid, oleic acid, or erucic acid; fatty amides such as stearamide, oleamide, erucamide, or N,N'-ethylenebis-stearamide; polyethylene wax; oxidized polyethylene wax; polymers of ethylene oxide; copolymers of ethylene oxide and propylene oxide; vegetable waxes; petroleum waxes; non ionic surfactants; and polysiloxanes. Processing aids can be used in amounts of 0.05 to 5 wt % based on the weight of the composition.

Examples of fillers include but are not limited to clays, precipitated silica and silicates, fumed silica calcium carbonate, ground minerals, and carbon blacks. Fillers can be used in amounts ranging from less than 0.01 to more than 50 wt % based on the weight of the composition.

Examples of flame retardants include but are not limited to magnesium hydroxide, aluminum trihydroxide, huntite, hydromagnesite, antimony trioxide, potassium hydroxide, calcium phosphate, zirconium oxide, titanium oxide, zinc oxide, magnesium oxide, magnesium carbonate, calcium carbonate, barium sulfate, barium borate, meta-barium borate, zinc borate, meta-zinc borate, aluminum anhydride, molybdenum disulfide, clay, red phosphorus, diatomite, kaolinite, montmorilonite, hydrotalcite, talc, silica, white carbon, celite, asbestos, and lithopone. Magnesium hydroxide and aluminum trihydroxide are preferred flame retardants.

Applications

The crosslinked compositions of this invention find utility in any application that employs crosslinked thermoplastics and for which the by-products or kinetic constraints of peroxide technology are potentially onerous. These applications include, but are not limited to, articles in the form of wire or cable sheaths such as electrical insulation, electrical junction shielding and shoe soles. The crosslinked compositions made by the process of this invention can also be used as plastic additives.

The following examples illustrate various embodiments of this invention. All parts and percentages are by weight unless otherwise indicated.

SPECIFIC EMBODIMENTS

Examples 1-3 and Comparative Examples C1-C3

For all of the examples and comparative examples reported in the following Table, the base polymer (between 40.0 and 40.3 grams of PRIMACOR® 1321 or PRIMACOR® 3150) was first added to a twin-screw mixer and agitated at 25 rpm and a temperature between 109 and 112° C. After 3-9 minutes the oligoamine is added to the base polymer, and the mixture is agitated for an additional 5-8 minutes during which the temperature ranges between 108-115° C. The mixer is then stopped, and the compounded material removed and allowed to solidify. A sample (4-6 g) is compressed into a disk between two sheets of non-interacting film and analyzed by oscillating rheometry at 100 rpm and 0.5° excursion at 200° C. The torque values (S' in inch-pounds) exhibited by this sample at various times are shown in the Table. The higher the torque value, the greater the degree of crosslinking.

TABLE

Torque Values of Examples 1-3 and Comparative Examples C1-C3

| Ex. | Base Polymer* | X-linking Agent | X-linker Amount (mmol/g)+ | COOH/ NH$_2$± | S' @ 15 min | S' @ 45 min | S' @ 120 min |
|---|---|---|---|---|---|---|---|
| 1 | 1321 | TETA | 0.041 | 11.0 | 2.06 | 3.21 | 3.94 |
| C1 | 1321 | EDEA | 0.038 | 11.9 | 0.60 | 1.46 | 1.70 |
| 2 | 1321 | DETA | 0.045 | 10.1 | 1.66 | 2.22 | 2.50 |
| C2 | 1321 | HMDA | 0.041 | 10.9 | 0.53 | 1.97 | 2.77 |
| 3 | 3150 | TETA | 0.202 | 1.0 | 0.76 | 3.72 | 6.62 |
| C3 | 3150 | HMDA | 0.203 | 1.0 | 0.09 | 0.89 | 3.37 |

*PRIMACOR® 1321 ethylene acrylic acid copolymer containing 6.5 wt % units derived from acrylic acid.
*PRIMACOR® 3150 ethylene acrylic acid copolymer containing 3.0 wt % units derived from acrylic acid.
+mmol/g = millimoles per gram
±COOH/NH$_2$ = molar ratio of acid or anhydride groups on the base polymer to amino groups on the crosslinking agent.
TETA = triethylenetetramine.
DETA = diethylenetriamine.
EDEA = 2,2'-(ethylenedioxy)diethylamine.
HMDA = hexamethylenediamine.

Although the invention has been described in considerable detail through the preceding description, drawings and examples, this detail is for the purpose of illustration. One skilled in the art can make many variations and modifications without departing from the spirit and scope of the invention as described in the appended claims.

The invention claimed is:

1. A water-and peroxide-free process of preparing a crosslinked insulating polymer material, the process comprising:
   extruding a mixture of a polymer containing carboxyl groups with at least one oligoamine onto a wire or cable, the oligoamine selected from the group consisting of N,N'-bis(2-aminoethyl)piperazine (DAEP), and N[(2-aminoethyl)2-aminoethyl]piperazine (PEEDA),
   exposing the polymer mixture to a temperature between the melting point of the polymer and 200° C. to crosslink the polymer by amide bond formation to form a solid, crosslinked, insulating polymer material over the wire or cable,
   wherein the crosslinking of said polymer occurs at a faster rate than the crosslinking of a mixture of the same polymer with an oligoamine that is not said at least one oligoamine under the same extruding and exposing conditions.

2. The process of claim 1 in which the polymer comprises between 80 and 98 percent by weight of units derived from an olefin.

3. The process of claim 2 in which the olefin is at least one of ethylene and propylene.

4. The process of claim 3 in which the polymer comprises between 2 and 20 percent by weight of units derived from (meth)acrylic acid.

5. The process of claim 1 in which the polymer is a copolymer of ethylene and acrylic acid.

6. An article made by the process of claim 1.

7. The article of claim 6 in the form of a wire or cable sheath or an electrical junction shielding .

8. The process of claim 1, wherein the polymer mixture is co-extruded with a jacketing layer, a semiconductor insulation layer, or both.

9. The process of claim 1, wherein said faster rate of crosslinking is exhibited by a higher torque value (S') in inch-pounds of the cross-linked polymer extruded with said at least one oligoamine compared to the torque value (S') of the cross-linked polymer extruded without said at least one oligoamine.

10. The process of claim 9, wherein said higher torque value is exhibited at 15 to 45 minutes of said exposing step.

11. A water- and peroxide-free process of preparing a crosslinked insulating polymer material, the process comprising:
  extruding a mixture of a polymer containing carboxyl groups with triethylenetetramine onto a wire or cable, the triethylenetetramine being a mixture of oligoamines consisting of N,N'-bis(2-aminoethyl)-1,2-ethanediamine (L-TETA), N,N'-bis(2-aminoethyl)piperazine (DAEP), N[(2-aminoethyl)2-aminoethyl]piperazine (PEEDA) and tris-(2-aminoethyl)amine (TAEA), and
  exposing the polymer mixture to a temperature between the melting point of the polymer and 200° C. to crosslink the polymer by amide bond formation to form a solid, crosslinked, insulating polymer material over the wire or cable,
  wherein the crosslinking of said polymer occurs at a faster rate than the crosslinking of a mixture of the same polymer with an oligoamine that is not said triethylenetetramine under the same extruding and exposing conditions.

12. The process of claim 11 in which the polymer comprises between 80 and 98 percent by weight of units derived from an olefin.

13. The process of claim 12 in which the olefin is at least one of ethylene and propylene.

14. The process of claim 13 in which the polymer comprises between 2 and 20 percent by weight of units derived from (meth)acrylic acid.

15. The process of claim 11 in which the polymer is a copolymer of ethylene and acrylic acid.

16. An article made by the process of claim 11.

17. The article of claim 16 in the form of a wire or cable sheath or an electrical junction shielding.

18. The process of claim 11, wherein the polymer mixture is co-extruded with a jacketing layer, a semiconductor insulation layer, or both.

* * * * *